United States Patent
Tanimura et al.

(10) Patent No.: US 7,472,682 B2
(45) Date of Patent: Jan. 6, 2009

(54) SYSTEM HAVING A SCREW

(75) Inventors: Hiroshi Tanimura, Kariya (JP); Hisashi Kino, Obu (JP)

(73) Assignees: Denso Corporation (JP); Aisan Industry Co., Ltd. (JP)

( * ) Notice: Subject to any disclaimer, the term of this patent is extended or adjusted under 35 U.S.C. 154(b) by 247 days.

(21) Appl. No.: 11/607,925

(22) Filed: Dec. 4, 2006

(65) Prior Publication Data

US 2007/0144486 A1 Jun. 28, 2007

(30) Foreign Application Priority Data

Dec. 28, 2005 (JP) ............................... 2005-379054

(51) Int. Cl.
*F02M 19/00* (2006.01)
*F02D 11/04* (2006.01)

(52) U.S. Cl. .................. 123/339.13; 123/399; 251/285

(58) Field of Classification Search ............ 123/339.11, 123/339.13, 396, 395, 399, 400; 251/285
See application file for complete search history.

(56) References Cited

U.S. PATENT DOCUMENTS

| | | | | |
|---|---|---|---|---|
| 2,190,738 | A * | 2/1940 | Schweiss | 123/339.1 |
| 4,200,596 | A * | 4/1980 | Iiyama et al. | 261/65 |
| 4,268,881 | A * | 5/1981 | Saito | 360/291.2 |
| 4,474,152 | A * | 10/1984 | Horiuchi et al. | 123/339.13 |
| 4,940,031 | A * | 7/1990 | Mann | 123/339.13 |
| 6,189,506 | B1 * | 2/2001 | Vanderveen | 123/337 |
| 6,382,180 | B2 | 5/2002 | Wayama et al. | |
| 6,382,181 | B2 | 5/2002 | Wayama et al. | |
| 6,418,908 | B2 | 7/2002 | Wayama et al. | |
| 6,640,776 | B2 | 11/2003 | Torii | |
| 6,691,681 | B2 | 2/2004 | Wayama et al. | |
| 6,694,947 | B2 | 2/2004 | Wayama et al. | |
| 6,834,639 | B2 * | 12/2004 | Torii | 123/396 |
| 7,047,937 | B2 * | 5/2006 | Frank et al. | 123/339.11 |
| 2001/0035157 | A1 | 11/2001 | Wayama et al. | |
| 2002/0189585 | A1 | 12/2002 | Wayama et al. | |
| 2004/0060542 | A1 | 4/2004 | Wayama et al. | |
| 2004/0062595 | A1 | 4/2004 | Suzuki | |
| 2005/0087172 | A1 | 4/2005 | Torii | |
| 2005/0178359 | A1 | 8/2005 | Wayama et al. | |

\* cited by examiner

*Primary Examiner*—Stephen K Cronin
*Assistant Examiner*—Arnold Castro
(74) *Attorney, Agent, or Firm*—Nixon & Vanderhye PC

(57) ABSTRACT

A system having a screw structure includes a casing and a self-tapping screw. The casing includes a through hole. The self-tapping screw includes a male thread portion and an unthreaded column portion arranged relative to each other in a longitudinal direction of the self-tapping screw, and is threadably coupled to the casing through the through hole. The through hole includes a large diameter hole portion and a small diameter hole portion. The large diameter hole portion is engaged with the male thread portion. The small diameter hole portion is engaged with the unthreaded column portion. The large diameter hole portion has a longitudinal length shorter than a longitudinal length of the unthreaded column portion.

14 Claims, 4 Drawing Sheets

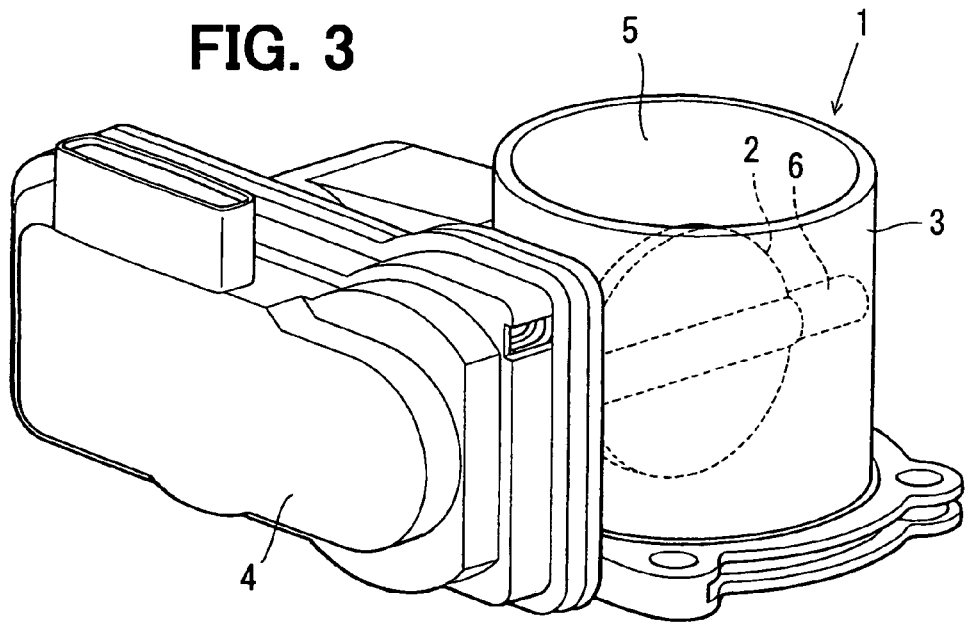
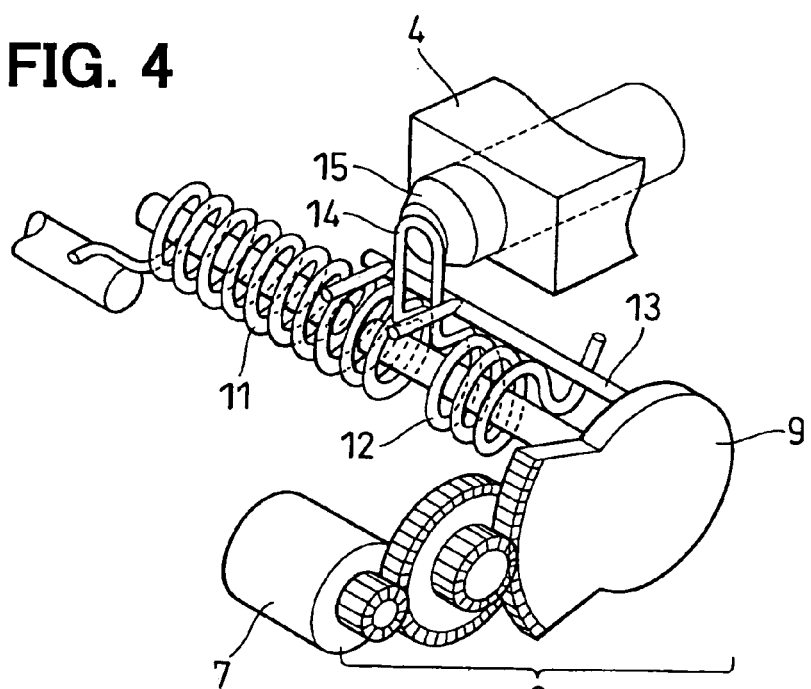
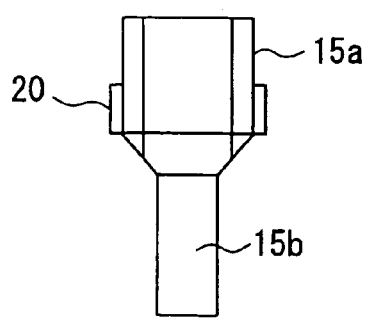

US 7,472,682 B2

SYSTEM HAVING A SCREW

CROSS REFERENCE TO RELATED APPLICATION

This application is based on and incorporates herein by reference Japanese Patent Application No. 2005-379054 filed on Dec. 28, 2005.

BACKGROUND OF THE INVENTION

1. Field of the Invention

The present invention relates to a screw apparatus, in which a self-tapping screw is screwed to a case by screwing the self-tapping screw into a through hole formed at the case. The present invention relates, more particularly, to a system, in which an internal mechanism (e.g., a gear mechanism) is provided inside the case.

2. Description of Related Art

There have been utilized various screw apparatuses, in which a screw having a male thread portion is screwed into a case. As one example, a valve drive assembly of an electronic throttle will be described to explain the conventional art (see, for example, Japanese Unexamined Patent Publication No. 2000-110589 corresponding to U.S. Pat. No. 6,694,947 and Japanese Unexamined Patent Publication No. 2002-256894 corresponding to U.S. Pat. No. 6,834,639).

A housing case 104 for a drive system of the electronic throttle includes an electric drive device and a middle opening position returning device (middle position locating device) as shown in FIG. 6. Here, the electric drive device changes an opening position of a throttle valve (not shown) using electric power. The middle opening position returning device stops the throttle valve at a middle opening position.

The electric drive device includes an electric motor 107 and a gear mechanism 108. Here, the electric motor 107 is electrically controlled by an engine control unit (ECU), which is not shown, and the gear mechanism 108 reduces a rotational output of the electric motor 107 and delivers the output to a throttle shaft, which is rotatable integrally with the throttle valve (not shown).

The middle opening position returning device returns (locates) a stop position of the throttle shaft back to a middle position using a restoring force of springs when the electric motor 107 is stopped. Here, the middle position corresponds to a middle stop opening degree for the throttle valve, and the springs are, specifically, a closed side spring 111 and an open side spring 112. Thus, a stop opening degree of the throttle valve can be set at the middle stop opening degree (i.e., the throttle valve can be set at the middle position) so that a vehicle can be driven even in a case where the electronic throttle is broken and the electric motor 107 is turned off.

Here, the middle stop opening degree used in the middle opening position returning device is set at a position such that an air flow rate required for the emergency running can be achieved. Because target middle stop opening degrees are different for different vehicles, the electronic throttle is provided with an adjusting screw 115 for further adjusting the middle stop opening degree.

In the adjustment of the middle stop opening degree, for example, a closed side stop position of a spring hook 114, which is formed at a connection between the closed side spring 111 and the open side spring 112, is adjusted. The closed side stop position of the spring hook 114 is adjusted by advancing the adjusting screw 115 toward or away from the case 104 (see FIG. 6).

FIG. 7 shows a screw structure of the screw apparatus, in which the adjusting screw is screwed to the case as described above.

A conventional screw structure includes a case J1, which has a female threaded member J2, and an adjusting screw J3, which is screwed into the female threaded member J2. Specifically, in a case where the case J1 is formed using metal, the metallic case J1 is provided with the female threaded member J2. In another case where the case J1 is formed using resin, a metallic female threaded member is molded with the resin case J1.

However, in the conventional screw apparatus, because a machining process for the female thread J2 is required, a cost is increased. Also, in a case where chippings remain in the thread of the female threaded member J2, the chippings may enter into the case J1 while the apparatus is in assembly or in use. As a result, the gear mechanism included in the case J1 may not work properly.

Also, there has been disclosed a technology, in which the case does not require the machining process of the female thread because a self-tapping screw serves as the adjusting screw. In this technology, firstly, a resin case is provided with a through hole, and then the self-tapping screw, which is the adjusting screw, is screwed into the through hole (see Japanese Unexamined Patent Publication No. 2004-122511 corresponding to US Patent Publication No. 2004/0062595).

However, even in the technology disclosed in Japanese Unexamined Patent Publication No. 2004-122511 corresponding to US Patent Publication No. 2004/0062595, the chippings may be generated when the adjusting screw (the self-tapping screw) is screwed into the through hole. This is because a part of the case (e.g., an inner wall of the through hole) is cut by a male thread portion of the adjusting screw. Then, the chippings generated by the adjusting screw may enter into the case. Therefore, similar to the screw structure with a machined female threaded member, the chippings may enter into the case while the apparatus is in assembly or in use. As a result, the gear mechanism included in the case J1 may not work properly.

SUMMARY OF THE INVENTION

The present invention is made in view of the above disadvantages. Thus, it is an objective of the present invention to address at least one of the above disadvantages.

To achieve the objective of the present invention, there is provided a system having a screw structure, the system including a casing and a self-tapping screw. The casing includes a through hole. The self-tapping screw includes a male thread portion and an unthreaded column portion arranged relative to each other in a longitudinal direction of the self-tapping screw, and is threadably coupled to the casing through the through hole. The through hole includes a large diameter hole portion and a small diameter hole portion. The large diameter hole portion is engaged with the male thread portion. The small diameter hole portion is engaged with the unthreaded column portion. The large diameter hole portion has a longitudinal length shorter than a longitudinal length of the unthreaded column portion such that the unthreaded column portion is within the small diameter hole portion before the male thread portion contacts large diameter portion when the self-tapping screw is inserted into the through hole.

To achieve the objective of the present invention, there is also provided a gear assembly, which includes a casing, a self-tapping screw, and a gear mechanism. The casing includes a through hole. The self-tapping screw includes a male thread portion and an unthreaded column portion arranged relative to each other in a longitudinal direction of the self-tapping screw, and is threadably coupled to the casing through the through hole. The gear mechanism is included in the casing. The through hole includes a large diameter hole portion and a small diameter hole portion. The large diameter hole portion is engaged with the male thread portion. The small diameter hole portion is engaged with the unthreaded column portion. The large diameter hole portion has a longitudinal length shorter than a longitudinal length of the unthreaded column portion such that the unthreaded column portion is within the small diameter hole portion before the male thread portion contacts large diameter portion when the self-tapping screw is inserted into the through hole.

To achieve the objective of the present invention, there is also provided a throttle assembly, which includes a casing, a self-tapping screw, a gear mechanism, an intake passage, a throttle valve, an electric drive device, and a middle position locating device. The casing includes a through hole. The self-tapping screw includes a male thread portion and an unthreaded column portion arranged relative to each other in a longitudinal direction of the self-tapping screw, and is threadably coupled to the casing through the through hole. The gear mechanism is included in the casing. The throttle valve adjusts an opening degree of the intake passage. The electric drive device is provided inside the casing, and the electric drive device drives the throttle valve using the gear mechanism. The middle position locating device includes bias members and locates the throttle valve at a target position using a restoring force of the bias members such that the opening degree of the intake passage is set at a middle opening degree. The through hole includes a large diameter hole portion and a small diameter hole portion. The large diameter hole portion is engaged with the male thread portion. The small diameter hole portion is engaged with the unthreaded column portion. The large diameter hole portion has a longitudinal length shorter than a longitudinal length of the unthreaded column portion such that the unthreaded column portion is within the small diameter hole portion before the male thread portion contacts large diameter portion when the self-tapping screw is inserted into the through hole. The self-tapping screw adjusts the target position of the throttle valve.

BRIEF DESCRIPTION OF THE DRAWINGS

The invention, together with additional objectives, features and advantages thereof, will be best understood from the following description, the appended claims and the accompanying drawings in which:

FIG. 3 is a perspective view of an electronic throttle;

FIG. 4 is a schematic perspective view of a valve drive assembly;

FIG. 5 is a schematic drawing of a self-tapping screw and adhesive applied thereto according to a second embodiment of the present invention;

DETAILED DESCRIPTION OF PREFERRED EMBODIMENTS

First Embodiment

Figure 1A:
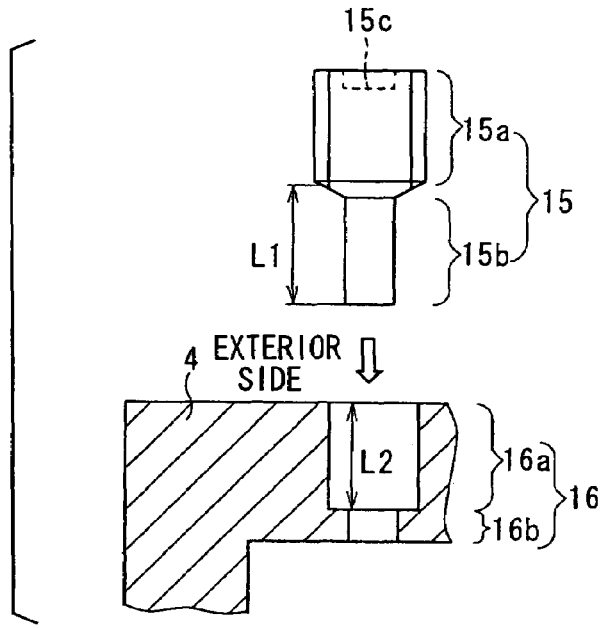
FIG. 1A is a schematic drawing of a structure of a screw apparatus according to a first embodiment of the present invention.

The first embodiment relates to an electronic throttle, and will be described with reference to accompanying drawings.

Firstly, with reference to FIGS. 3, 4, a basic structure of the electronic throttle will be described. FIG. 4 is an explanatory view of a basic structure of an electric drive device and a middle opening position returning device (middle position locating device).

The electronic throttle includes a resin throttle body 1 shown in FIG. 3.

The throttle body 1 includes a cylindrical body (bore) 3, which receives a throttle valve 2, and a receiving case 4, which receives a valve drive assembly (FIG. 4) for rotating and driving the throttle valve 2. Here, the case 4 includes a housing base and a cover. The housing base is formed integrally with the cylindrical body 3 using a resin material (e.g., phenylene resin, polyamide resin). The cover is mounted to the case 4 after components have been assembled inside the case 4, and is made of the resin material (e.g., phenylene resin, polyamide resin).

The cylindrical body 3 constitutes an intake passage 5, and includes a flange at an end portion of the cylindrical body 3, the flange being connected with, for example, an intake manifold.

The throttle valve 2 is a butterfly valve, and is rotatable integrally with a throttle shaft (rotational axis) 6. The throttle shaft 6 is rotatably supported by the cylindrical body 3. In this way, the throttle valve 2 controls an intake air amount that flows through the intake passage 5.

A rotation angle of the throttle shaft 6 is set by the valve drive assembly shown in FIG. 4. The valve drive assembly is provided inside the case 4 as described above, and includes the electric drive device and the middle opening position returning device. In one embodiment, the electric drive device changes a rotation position of the throttle valve 2 using electric power. The middle opening position returning device (middle position locating device) stops the throttle valve 2 at a position (middle position) corresponding to a middle opening degree.

In one embodiment, an angle sensor (not shown), which detects a rotation angle of the throttle shaft 6 in a non-contacting manner, is also provided inside the case 4.

The electric drive device includes an electric motor 7 and a gear mechanism (gear trains) 8. The last gear 9 of the gear mechanism 8 rotates integrally with the throttle shaft 6 shown in FIG. 3. Here, the electric motor 7 is electrically controlled by an engine control unit (ECU), which is not shown, and the gear mechanism 8 reduces a rotational output of the electric motor 7 and delivers the output to the throttle shaft 6.

The ECU computes a target throttle opening degree (target throttle position) based on an accelerator pedal position adjusted by a driver. Then, the ECU operates the throttle valve 2 by controlling an electric amount supplied to the electric motor 7 such that the rotation angel detected by the angle sensor corresponds to the computed target throttle opening degree.

The middle opening position returning device returns (locates) the throttle shaft 6 to a predetermined position (target position), which corresponds to a predetermined middle stop opening degree of the throttle valve 2, using a restoring force of at least one biasing member in a case where the electric motor 7 is stopped (where the electric motor 7 is turned off). In the embodiment shown, the biasing members include a closed side spring 11 and an open side spring 12.

The closed side spring 11 is a helical torsion coil spring, which returns a lever 13 from a totally open position to the middle stop position. Here, the lever 13 rotates integrally with the last gear 9 of the gear mechanism 8.

The open side spring 12 is another helical torsion coil spring, which returns the lever 13 from a totally closed position to the middle stop position.

In the present embodiment, the closed side spring 11 and the open side spring 12 are formed using a single spring material. More specifically, a spring hook 14 is includes as a connection between the closed side spring 11 and the open side spring 12. The spring hook 14 has a U-shape. In this structure, the spring hook 14 contacts an end face of the adjusting screw 15 due to the spring force of the closed side spring 11.

Due to the middle opening position returning device, a stop opening degree of the throttle valve 2 can be set at the middle stop opening degree (i.e., the throttle valve 2 can be located at the middle position). Thus, the vehicle can be driven even in a case where the electronic throttle is broken and the electric motor 7 is turned off.

Characteristics of the present embodiment will be described.

Figure 1B:
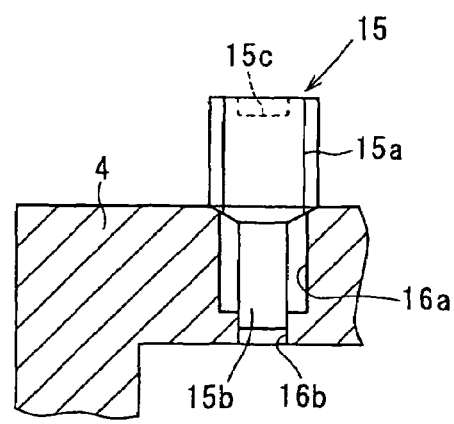
FIG. 1B is a schematic drawing of another structure of the screw apparatus according to the first embodiment of the present invention.
Figure 1C:
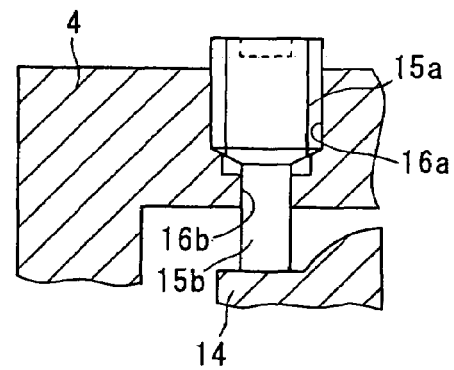
FIG. 1C is a schematic drawing of another structure of the screw apparatus according to the first embodiment of the present invention.

The electronic throttle of the present embodiment includes a technology shown in FIGS. 1A to 1C. Specifically, the case 4 includes the through hole 16, which does not have the female threaded portion, and serves as the screw hole of the adjusting screw 15 coupled to the case 4. The self-tapping screw, which is made of a material (e.g., a metallic material such as stainless, steel, iron) harder than the case 4, serves as the adjusting screw 15.

Thus, a male thread portion 15*a*, which is provided on the adjusting screw (self-tapping screw), forms a threading on an inner surface of the through hole 16, and is screwed to the case 4 when the adjusting screw 15 is rotated and inserted into the through hole 16.

As another characteristic of the present embodiment, the adjusting screw 15 includes a distal end circular column portion (unthreaded column portion) 15*b* at a distal end side of the male thread portion 15*a* (see FIG. 1A). Here, the circular column portion 15*b* has a cylindrical column shape and is unthreaded, and the distal end side of the adjusting screw 15 is an insertion end of the screw 15. The screw 15 is screwed into the case 4 from the insertion end. The circular column portion 15*b* has a cylindrical shape, and also has an outer diameter smaller than that of the male thread portion 15*a*. A longitudinal axis of the circular column portion 15*b* is aligned with that of the male thread portion 15*a*.

As shown in FIG. 1A, the through hole 16 includes a large diameter hole 16*a* at an entrance side of the through hole 16 (an exterior side of the case 4). Here, the male thread portion 15*a* of the adjusting screw 15 is threadably coupled to the large diameter hole 16*a*. Also, the through hole 16 includes a small diameter hole 16*b* at one end (on an interior side of the case 4). In one embodiment, the small diameter hole 16*b* has a circular shape, which generally corresponds to an outer shape and size of the circular column portion 15*b*. A longitudinal axis of the small diameter hole 16*b* is aligned with that of the large diameter hole 16*a*.

Here, in one embodiment, the inner diameter of the small diameter hole 16*b* corresponds in size to the outer diameter of the circular column portion 15*b*. In another embodiment, the inner diameter of the small diameter hole 16*b* is slightly smaller than the outer diameter of the circular column portion 15*b* such that the circular column portion 15*b* is frictionally fits therein. Further, in another embodiment, the inner diameter of the small diameter hole 16*b* is slightly larger than the outer diameter of the circular column portion 15*b* such that assembly is facilitated. When a slight clearance is formed between the circular column portion 15*b* and the small diameter hole 16*b*, the clearance is very small such that the chippings are unlikely to pass through the clearance.

The small diameter hole 16*b* has a cylindrical hole shape, which has an inner diameter generally corresponding to the outer diameter of the circular column portion 15*b*.

When inserting the adjusting screw 15 into the through hole 16, the male thread portion 15*a* enters and contacts the case 4 (an outer opening end of the large diameter hole 16*a*) after the circular column portion 15*b* has entered into the small diameter hole 16*b* (see FIG. 1B). In other words, L1 is set larger than L2 (L1>L2) when L1 is defined as a longitudinal length from a distal end of the circular column portion 15*b* to a distal end of the male thread portion 15*a*, and L2 is defined as a longitudinal length from the outer opening end of the large diameter hole 16*a* to an opening end of the small diameter hole 16*b* on a side opposite the interior of the case 4.

In the assembly process, firstly, the adjusting screw 15 is inserted into the through hole 16 (see FIG. 1B). Next, the adjusting screw 15 is screwed into the through hole 16 by use of a tool (e.g., screwdriver), which is engaged with a tool engaging portion 15*c* (e.g., a hexagon socket) formed at a top of the adjusting screw 15. Thus, the male thread portion 15*a* formed at the adjusting screw 15 cuts the threading on the inner surface of the through hole 16 and the adjusting screw 15 is threadably coupled to the case 4 (see FIG. 1C). Then, the stop position of the spring hook 14 (corresponding to the middle stop opening degree of the throttle valve 2) can be adjusted by adjusting a screw amount of the adjusting screw 15. In other words, the stop position of the spring hook 14 can be adjusted by advancing the adjusting screw 15 toward or away from the housing 4.

Figure 2A:
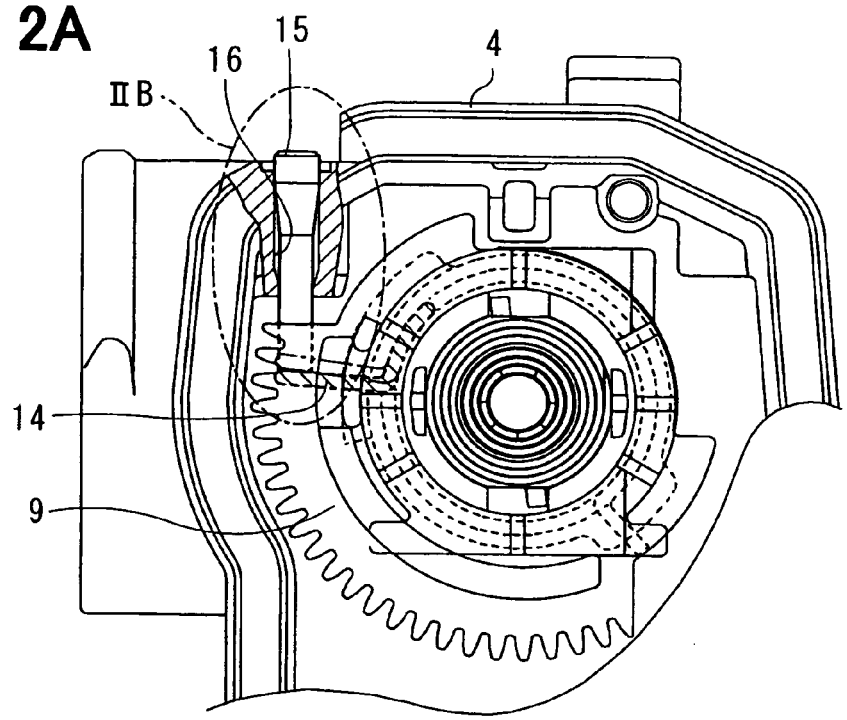
FIG. 2A is a partial view showing an internal structure of a case with a cover removed.
Figure 2B:
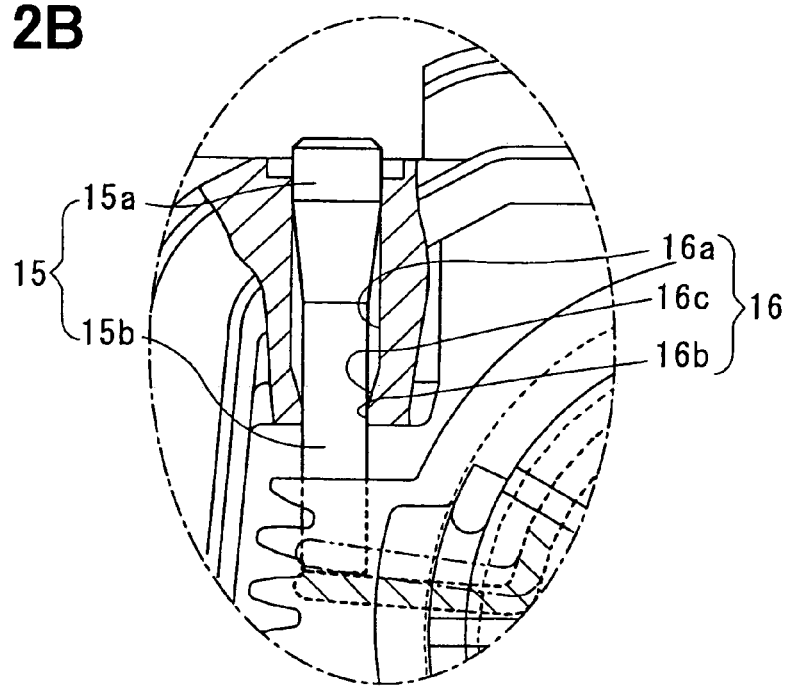
FIG. 2B is an enlarged view of a portion IIB in FIG. 2A.
Figure 6:
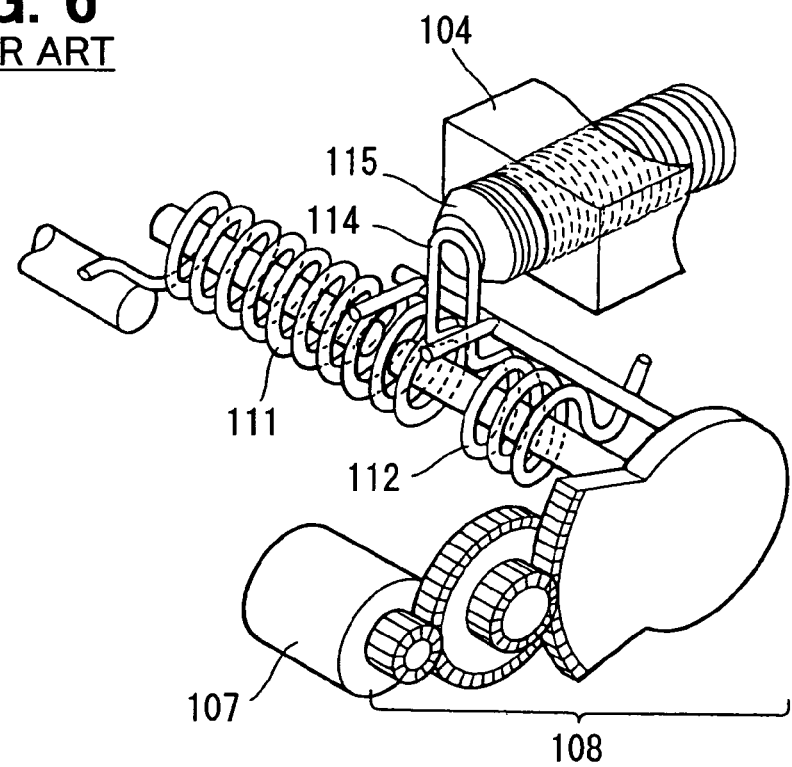
FIG. 6 is a sectional view of a conventional screw apparatus.
Figure 7:
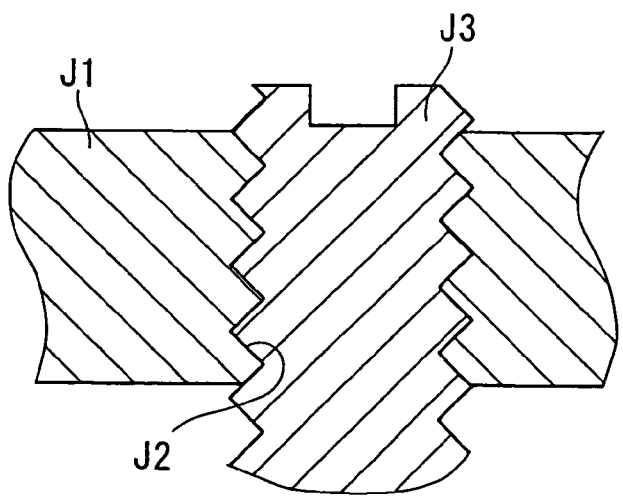
FIG. 7 is a schematic perspective view of the conventional valve drive assembly.

FIGS. 2A, 2B show specific structure examples of the above described structure.

As shown in FIGS. 2A, 2B, in the specific structure example, the through hole 16 includes a reducing diameter portion 16*c* such that the circular column portion 15*b* can be smoothly introduced to the small diameter hole 16*b* when the adjusting screw 15 is inserted into the through hole 16. Here, the reducing diameter portion 16*c* has a tapered shape and is located at a transition region between the large diameter hole 16*a* and the small diameter hole 16*b*.

Advantages (effects) of the first embodiment will be described. As described, the adjusting screw 15 adjusts the middle stop opening degree used in the middle opening position returning device of the electronic throttle of the first embodiment. In the present embodiment, the adjusting screw (the self-tapping screw) 15 is formed such that the male thread portion 15*a* of the adjusting screw 15 enters and contacts the case 4 after the circular column portion 15*b* has entered into the small diameter hole 16*b* during assembly.

In this way, when the adjusting screw 15 is screwed into the through hole 16 and the male thread portion 15*a* forms the threads on the inner surface of the through hole 16 (specifically, at the inner surface of the large diameter hole 16*a*), the circular column portion 15*b* obstructs the small diameter hole 16*b* such that the chippings generated while forming the threading are unlikely to enter into the case 4. In other words, the circular column portion 15*b* obstructs the small diameter hole 16b at a position back of the threaded surface of the through hole 16. This limits the generated chippings from entering into the case 4.

Specifically, a structure of the adjusting screw 15 of the electronic throttle includes the following advantages.

Because the self-tapping screw serves as the adjusting screw 15, the machining of the female thread at the case 4 is not required. Thus, the manufacturing cost can be reduced.

As described above, the adjusting screw 15 is structure such that the male thread portion 15a enters and contacts the case 4 after the circular column portion 15b has entered into the small diameter hole 16b when inserting the adjusting screw 15 into the through hole 16. As a result, when forming the threading by the male thread portion 15a, the chippings are unlikely to enter into the case 4 because the circular column portion 15b obstructs the small diameter hole 16b.

Thus, even in a structure where the adjusting screw 15 is threadably coupled into the case 4, the chippings are limited from entering into the case 4 when the chippings are generated. Thus, the gear mechanism 8 in the case 4 is unlikely to malfunction due to the chippings. As a result, the reliability of the electronic throttle can be improved.

Further, in the first embodiment, the small diameter hole 16b has a cylindrical hole shape. Thus, a longitudinal overlapped region (contact region) between the small diameter hole 16b and the circular column portion 15b can be larger. As a result, even when a slight clearance exists between the small diameter hole 16b and the circular column portion 15b, the chippings are unlikely to enter into the case 4. Therefore, the reliability can be improved.

Second Embodiment

The second embodiment will be described with reference to FIG. 5. Similar components of an electronic throttle of the present embodiment, which are similar to the components of the electronic throttle of the first embodiment, will be indicated by the same numerals. In the second embodiment, an adhesive 20 is applied to at least a portion of the male thread portion 15a of the adjusting screw 15. In one embodiment, the adhesive 20 is applied to the entire outer surface of the male thread portion 15a. In another embodiment, the adhesive 20 is applied to at least a distal end side portion of the male thread portion 15a as shown in FIG. 5. The adjusting screw 15 is screwed into the through hole 16 before the adhesive 20 is hardened.

Because the adhesive 20 is applied to the male thread portion 15a in the above-described manner, the adhesive 20 serves as a lubricant when the male thread is screwed into the large diameter hole 16a. As a result, the adjusting screw 15 can be smoothly and easily screwed into the case 4. In other words, because the adhesive 20 serves as the lubricant, a screw torque can be reduced and a friction between the adjusting screw 15 and the case 4 can be also reduced. Thus, the resin, which structures the case 4, is unlikely to fracture.

Because the chippings, which may be generated while the threading is formed by the male thread portion 15a, can be captured by the adhesive 20, the chippings are unlikely to fall toward the small diameter hole 16b. In this way, the chippings are unlikely to enter into the case 4.

Further, because the adhesive 20 is hardened after the adjustment of the middle stop opening degree using the adjusting screw 15 has been completed, the advantage also includes that the middle stop opening degree remains at a position.

In the above description, the adhesive 20 is applied to the male thread portion 15a as an example. However, the adhesive 20 may be alternatively applied to at least an end portion of the circular column portion 15b and the adjusting screw 15 may be screwed into the through hole 16 before the adhesive 20 is hardened.

Thus, even if the chippings fall toward the small diameter hole 16b, the chippings can be captured by the adhesive 20. As a result, the chippings are unlikely to enter into the case 4.

Modification will be described. In the above embodiment, the stop position of the spring hook 14 is adjusted by using the adjusting screw 15 as an example. However, in a case where the middle stop opening degree is adjusted by a middle lever, the middle lever may be alternatively adjusted by the adjusting screw 15.

In the above embodiment, the present invention is applied to the adjusting screw 15 for adjusting the middle stop opening degree of the electronic throttle. However, the present invention is not limited to the adjusting screw 15 of the electronic throttle. The present invention may be alternatively applicable to other adjusting screws for adjusting other adjusting mechanisms.

In the above embodiments, the adjusting screw 15 is described as an applicable example of the present invention. However, the present invention is not limited to the adjusting screw 15. The present invention may be applicable to all screw apparatuses (structures), in which a screw member is screwed into a case 4 from an exterior to an interior of the case 4.

Additional advantages and modifications will readily occur to those skilled in the art. The invention in its broader terms is therefore not limited to the specific details, representative apparatus, and illustrative examples shown and described.

What is claimed is:

1. A system having a screw structure comprising:
  a casing that includes a through hole; and
  a self-tapping screw that includes a male thread portion and an unthreaded column portion arranged relative to each other in a longitudinal direction of the self-tapping screw, and is threadably coupled to the casing through the through hole, wherein:
  the through hole includes:
    a large diameter hole portion, which is engaged with the male thread portion; and
    a small diameter hole portion, which is engaged with the unthreaded column portion; and
  the large diameter hole portion has a longitudinal length shorter than a longitudinal length of the unthreaded column portion such that the unthreaded column portion is within the small diameter hole portion before the male thread portion contacts large diameter portion when the self-tapping screw is inserted into the through hole.

2. The system according to claim 1, wherein:
  the small diameter hole portion has a hole shape corresponding to an outer shape and size of the unthreaded column portion.

3. The system according to claim 1, wherein:
  the small diameter hole portion includes a hole of a diameter approximately equal to an outer diameter of the unthreaded column portion.

4. The system according to claim 1, further comprising:
  an adhesive that is provided to at least one of the following:
  a distal end side portion of the male thread portion; and
  a distal end side portion of the cylindrical column portion.

5. The system according to claim 1, wherein:
  the casing includes a gear mechanism therein.

6. The system according to claim 5, further comprising:

an intake passage;

a throttle valve that adjusts an opening degree of the intake passage;

an electric drive device that is provided inside the casing, the electric drive device driving the throttle valve using the gear mechanism; and a middle position locating device that includes bias members and locates the throttle valve at a target position using a restoring force of the bias members such that the opening degree of the intake passage is set at a middle opening degree, wherein:

the self-tapping screw adjusts the target position of the throttle valve.

7. A gear assembly comprising:

a casing that includes a through hole;

a self-tapping screw that includes a male thread portion and an unthreaded column portion arranged relative to each other in a longitudinal direction of the self-tapping screw, and is threadably coupled to the casing through the through hole; and a gear mechanism that is included in the casing, wherein:

the through hole includes:

a large diameter hole portion, which is engaged with the male thread portion; and a small diameter hole portion, which is engaged with the unthreaded column portion; and the large diameter hole portion has a longitudinal length shorter than a longitudinal length of the unthreaded column portion such that the unthreaded column portion is within the small diameter hole portion before the male thread portion contacts large diameter portion when the self-tapping screw is inserted into the through hole.

8. The gear assembly according to claim 7, wherein:

the small diameter hole portion has a hole shape corresponding to an outer shape and size of the unthreaded column portion.

9. The gear assembly according to claim 7, wherein:

the small diameter hole portion includes a hole of a diameter approximately equal to an outer diameter of the unthreaded column portion.

10. The gear assembly according to claim 7, further comprising:

an adhesive that is provided to at least one of the following:

a distal end side portion of the male thread portion; and a distal end side portion of the cylindrical column portion.

11. A throttle assembly comprising:

a casing that includes a through hole;

a self-tapping screw that includes a male thread portion and an unthreaded column portion arranged relative to each other in a longitudinal direction of the self-tapping screw, and is threadably coupled to the casing through the through hole;

a gear mechanism that is included in the casing;

an intake passage;

a throttle valve that adjusts an opening degree of the intake passage;

an electric drive device that is provided inside the casing, the electric drive device driving the throttle valve using the gear mechanism; and a middle position locating device that includes bias members and locates the throttle valve at a target position using a restoring force of the bias members such that the opening degree of the intake passage is set at a middle opening degree, wherein:

the through hole includes:

a large diameter hole portion, which is engaged with the male thread portion; and a small diameter hole portion, which is engaged with the unthreaded column portion;

the large diameter hole portion has a longitudinal length shorter than a longitudinal length of the unthreaded column portion such that the unthreaded column portion is within the small diameter hole portion before the male thread portion contacts large diameter portion when the self-tapping screw is inserted into the through hole; and the self-tapping screw adjusts the target position of the throttle valve.

12. The throttle assembly according to claim 11, wherein:

the small diameter hole portion has a hole shape corresponding to an outer shape and size of the unthreaded column portion.

13. The throttle assembly according to claim 11, wherein:

the small diameter hole portion includes a hole of a diameter approximately equal to an outer diameter of the unthreaded column portion.

14. The throttle assembly according to claim 11, further comprising:

an adhesive that is provided to at least one of the following:

a distal end side portion of the male thread portion; and a distal end side portion of the cylindrical column portion.

\* \* \* \* \*